United States Patent
Lai et al.

(10) Patent No.: US 7,198,497 B1
(45) Date of Patent: Apr. 3, 2007

(54) EJECTING DEVICE FOR CARD CONNECTOR

(75) Inventors: Yaw-Huey Lai, Taipei County (TW); Nai Hock Lwee, Singapore (SG)

(73) Assignee: Tai-Sol Electronics Co., Ltd. (TW)

( * ) Notice: Subject to any disclaimer, the term of this patent is extended or adjusted under 35 U.S.C. 154(b) by 0 days.

(21) Appl. No.: 11/411,946

(22) Filed: Apr. 27, 2006

(30) Foreign Application Priority Data

Nov. 7, 2005 (TW) .............................. 94219239 U

(51) Int. Cl.
*H01R 13/62* (2006.01)
(52) U.S. Cl. .................. 439/159; 439/630; 439/347
(58) Field of Classification Search ............. 439/159, 439/157, 630, 923, 347
See application file for complete search history.

(56) References Cited

U.S. PATENT DOCUMENTS

| | | | |
|---|---|---|---|
| 6,398,567 B1 * | 6/2002 | Nishimura | 439/159 |
| 6,419,509 B2 * | 7/2002 | Cho | 439/159 |
| 6,994,574 B1 * | 2/2006 | Lai | 439/159 |
| 7,070,430 B2 * | 7/2006 | Yang et al. | 439/159 |
| 2001/0036759 A1 * | 11/2001 | Ikemoto et al. | 439/159 |
| 2004/0266267 A1 * | 12/2004 | Inaba | 439/630 |
| 2005/0070142 A1 * | 3/2005 | Hanzawa et al. | 439/159 |

* cited by examiner

*Primary Examiner*—Michael C. Zarroli
(74) *Attorney, Agent, or Firm*—Bacon & Thomas PLLC

(57) ABSTRACT

An ejecting device for a card connector includes a base, a slide member, a first ejecting spring, a second ejecting spring, and retaining means. The base has an insertion slot having an opening end. The slide member is slidably mounted in the insertion slot of the base. The first ejecting spring has two ends contacting against the base and the slide member respectively. The second ejecting spring has two ends fixed to the base and the slide member respectively. The retaining means is mounted between the base and the slide member. Accordingly, the first and second springs can cause double ejections of the slide member to lengthen the stroke of the slide member, thus enabling the user to operate the card connector conveniently.

13 Claims, 3 Drawing Sheets

EJECTING DEVICE FOR CARD CONNECTOR

BACKGROUND OF THE INVENTION

1. Field of the Invention

The present invention relates generally to ejecting devices, and more particularly, to an ejecting device for a card connector.

2. Description of the Related Art

As the information technology is developing, a variety of electronic cards inseparable in use from the card connectors become more and more popular. Generally speaking, the electronic card is inserted into the corresponding card connector for data reading/writing after a user pushes the card by the hands into the insertion slot of the card connector until the card cannot be pushed forward anymore; meanwhile, the contact pads of the card are electrically connected with the contact terminals of the card connector.

When the operation is done and the card is being extracted from the card connector, generally speaking, the card is directly pulled out by the user's hands or ejected by an ejecting device. The currently available ejecting device is usually a compression spring having a short stroke of ejection. Because the card connector is more and more miniature, such structure disables the user from extracting the card from the card connector conveniently. Therefore, the currently available ejecting device for the card connector needs further improvement.

SUMMARY OF THE INVENTION

The primary objective of the present invention is to provide an ejecting device for a card connector, which stroke of ejection is long to enable the user to operate the card connector conveniently.

The foregoing objective of the present invention is attained by the ejecting device composed of a base, a slide member, a first ejecting spring, a second ejecting spring, and retaining means. The base includes an insertion slot having an opening end. The slide member is slidably mounted in the insertion slot of the base. The first ejecting spring includes two ends contacting against the base and the slide member respectively. The second ejecting spring includes two ends fixed to the base and the slide member respectively. The retaining means is mounted between the base and the slide member.

Further, the base includes a distal sidewall, a guide pillar extending from an inner side of the distal sidewall toward the insertion slot, a first positioning hole formed on a top side of the distal sidewall, and a second position hole running through one of two lateral sidewalls of the base.

Further, the guide pillar and the first positioning hole are adjacent to an end of the distal sidewall.

Further, the slide member includes a positioning hole formed on a top side thereof.

Preferably, the first ejecting spring is a compression spring fitted onto the guide pillar of the base.

Further, the retaining means includes a retaining channel, a retaining bar, and a positioning piece, wherein the retaining bar has two ends, one of which is mounted to a second positioning hole of the base and retained in position by the positioning piece, and the other of which is mounted to the retaining channel. The retaining bar holds the stroke of the slide member down through the retaining channel.

Further, one of the two ends of the compression spring is fixed to the slide member.

Preferably, the second ejecting spring is a torsion spring having two bended tiips mounted to the first positioning hole of the distal sidewall of the base and the positioning hole of the slide member respectively.

DETAILED DESCRIPTION OF PREFERRED EMBODIMENTS

Figure 1:
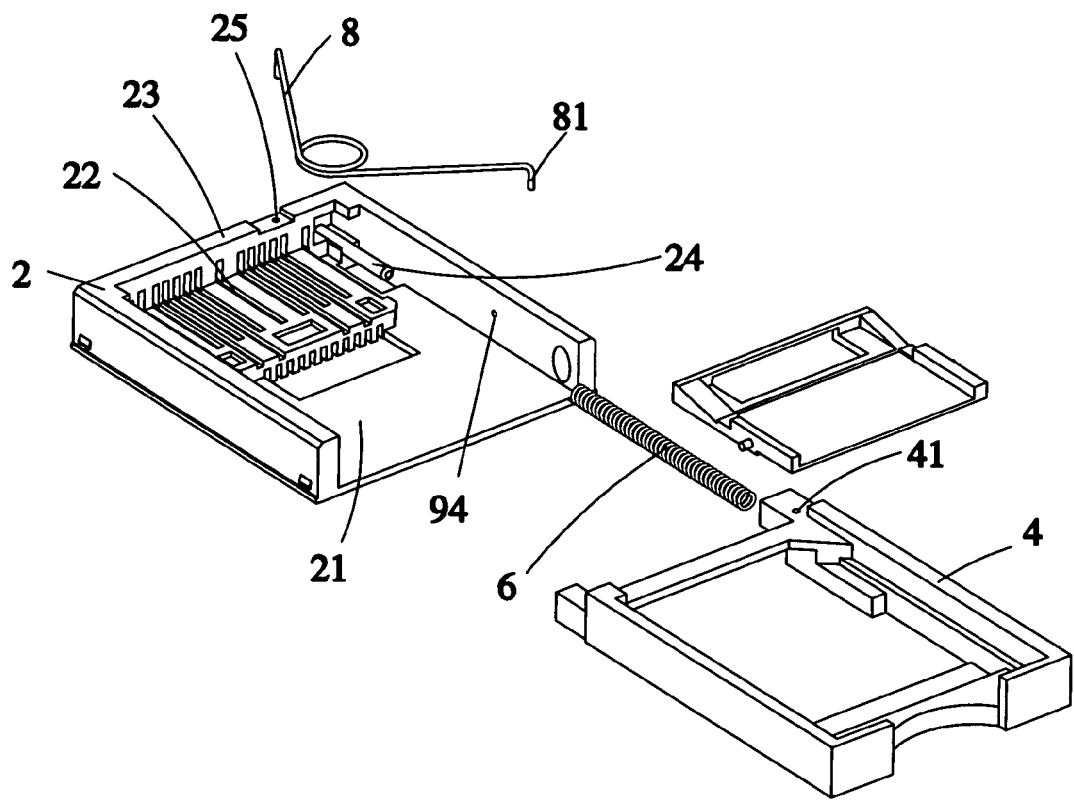
FIG. 1 is an exploded view of a preferred embodiment of the present invention.
Figure 2:
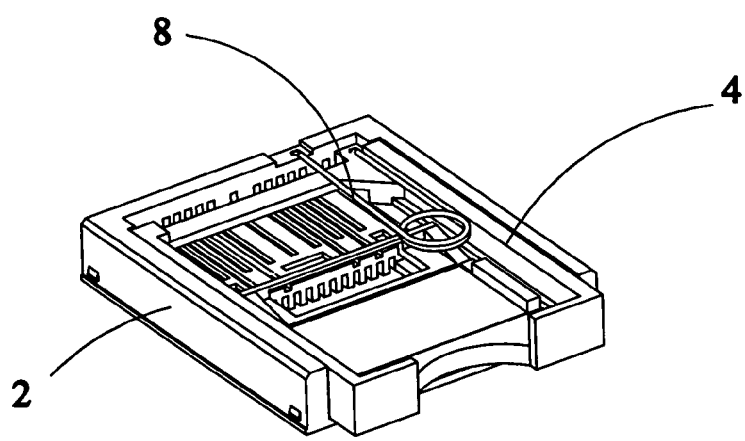
FIG. 2 is a perspective view of the preferred embodiment of the present invention.

Referring to FIGS. 1 and 2, an ejecting device for a card connector constructed according to a preferred embodiment of the present invention is composed of a base 2, a slide member 4, a first ejecting spring 6, a second ejecting spring 8, and retaining means 9.

The base 2 includes an insertion slot 21 having an opening end, a plurality of terminal tunnels 22 formed at the other end of the insertion slot 21 for receiving a plurality of contact terminals (not shown), a distal sidewall 23 formed at one end thereof abutting the terminal tunnels 22, a guide pillar 24 extending from an inner side of the distal sidewall toward the insertion slot 21, a first positioning hole 25 formed on a top side of the distal sidewall 23, and a second positioning 94 hole running through one of two lateral sidewalls. The guide pillar 24 and the first positioning hole 25 are adjacent to one end of the distal sidewall 23.

The slide member 4 is slidably mounted in the insertion slot 21 of the base 2, having a positioning hole 41 formed on a top side thereof.

The first ejecting spring 6 is a compression spring, fitted onto the guide pillar 24 of the base 2. The compression spring 6 has two ends contacting against the inner side of the distal sidewall 23 and the slide member 4 respectively. In this embodiment, one of the two ends of the compression spring 6 is fixed onto the slide member 4.

The second ejecting spring 8 is a torsion spring having two bended tips 81 mounted to the first position hole 25 of the distal sidewall 23 and the positioning hole 41 of the slide member 4 respectively.

Figure 3:
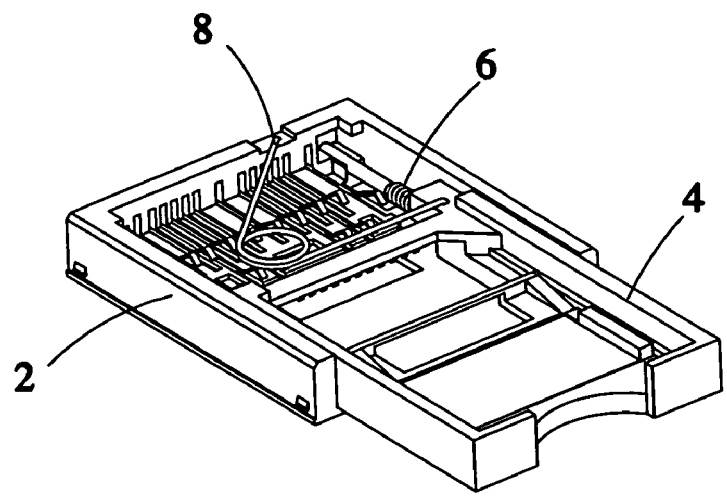
FIG. 3 is a schematic view of the preferred embodiment of the present invention, illustrating the first ejection.
Figure 4:
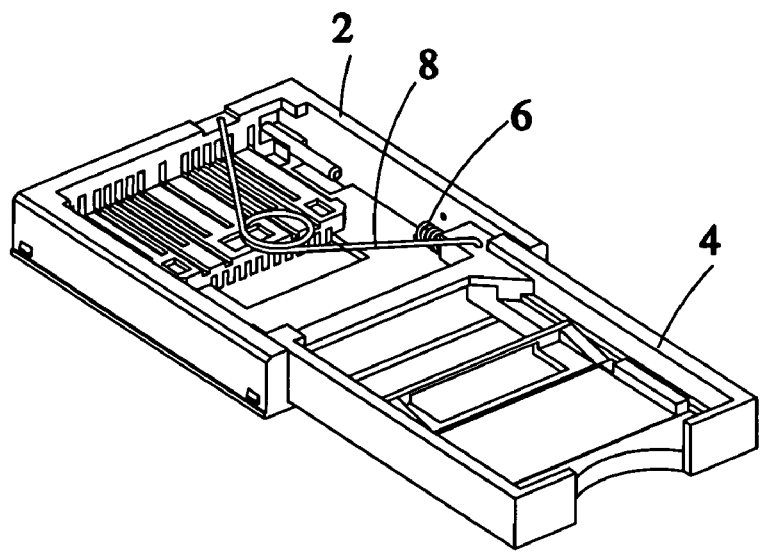
FIG. 4 is another schematic view of the preferred embodiment of the present invention, illustrating the second ejection.

Referring to FIGS. 3 and 4, the slide member 4 is ejected from the insertion slot 21 of the base 2 by the first and second ejecting springs 6 and 8 respectively. FIG. 3 shows that the slide member 4 is ejected from the base 2 by the first ejecting spring 6 for the first time. FIG. 4 shows that the slide member 4 is ejected from the base 2 by the second ejecting spring 8 for the second time.

Figure 5:
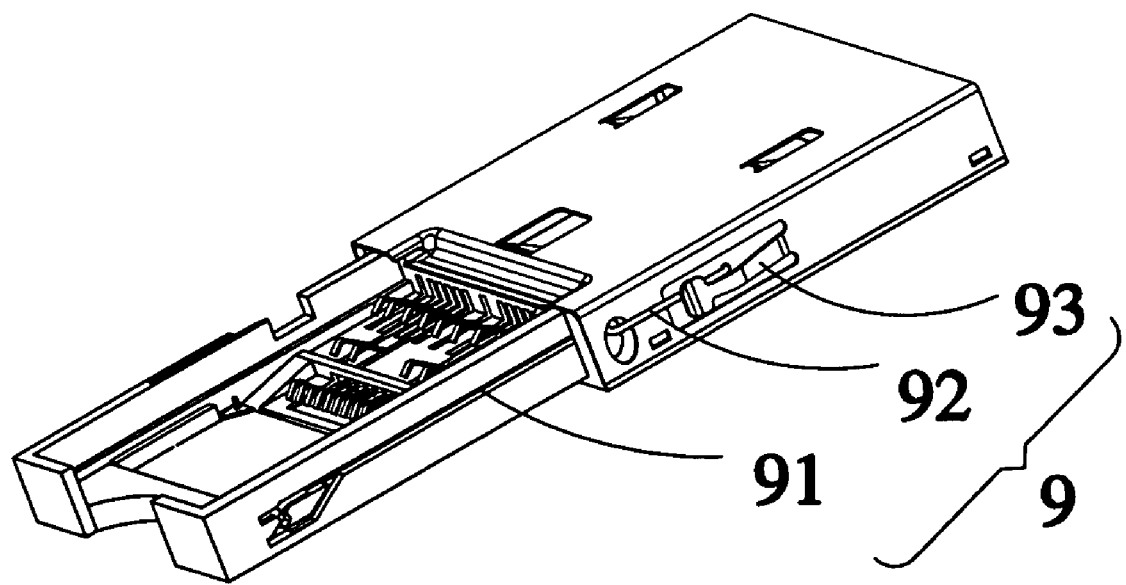
FIG. 5 is a schematic view of the preferred embodiment of the present invention retained in position.

As shown in FIGS. 1 and 5, the retaining means 9 includes a retaining channel 91, a retaining bar 92, and a positioning piece 93. The retaining bar 92 has two ends, one of which is mounted to the second positioning hole 94 of the base 2 and retained in position by the positioning piece 93, and the other of which is mounted to the retaining channel 91. While the slide member 4 is worked under a force, the retaining bar 92 holds the stroke of the slide member 4 down through the retaining channel 91.

The ejecting device of the present invention employs the compression and torsion springs for twice ejections of the slide member to lengthen the stroke of the slide member, thus enabling the user to operate the card connector conveniently.

Although the present invention has been described with respect to a specific preferred embodiment thereof, it is no way limited to the details of the illustrated structures but changes and modifications may be made within the scope of the appended claims.

What is claimed is:

1. An ejecting device for a card connector, comprising:
a base having an insertion slot, said insertion slot having an opening end;
a slide member slidably mounted in said insertion slot;
a first ejecting spring having two ends connecting against said base and said slide member respectively;
a second ejecting spring having two ends fixed onto the base and said slide member respectively; and
retaining means mounted between said base and said slide member;
wherein said base comprises a distal sidewall, a guide pillar extending from an inner side of said distal sidewall toward said insertion slot, a first positioning hole formed on a top side of said distal sidewall, and a second positioning hole formed at one of two lateral sidewalls thereof.

2. The ejecting device as defined in claim 1, wherein said guide pillar and said first positioning hole are adjacent to an end of said distal sidewall.

3. The ejecting device as defined in claim 1, wherein said slide member comprises a positioning hole formed on a top side thereof.

4. The ejecting device as defined in claim 1, wherein said first ejecting spring is a compression spring fitted onto said guide pillar of said base.

5. The ejecting device as defined in claim 4, wherein one of the two ends of said first ejecting spring is fixed onto said slide member.

6. The ejecting device as defined in claim 3, wherein said second ejecting spring is a torsion spring having two bended tips mounted to said first positioning hole of said distal sidewall of said base and said positioning hole of said slide member respectively.

7. An ejecting device for a card connector, comprising:
a base having an insertion slot, said insertion slot having an opening end;
a slide member slidably mounted in said insertion slot;
a first ejecting spring having two ends connecting against said base and said slide member respectively;
a second ejecting spring having two ends fixed onto the base and said slide member respectively; and
retaining means mounted between said base and said slide member;
wherein said retaining means comprises a retaining channel, a retaining bar, and a positioning piece, said retaining bar having two ends, one of which is mounted to said second positioning hole of said base and retained in position by said positioning piece and the other of which is mounted to said retaining channel, said retaining bar holding down the stroke of said slide member through said retaining channel.

8. The ejecting device as defined in claim 7, wherein said base comprises a distal sidewall, a guide pillar extending from an inner side of said distal sidewall toward said insertion slot, a first positioning hole formed on a top side of said distal sidewall, and a second positioning hole formed at one of two lateral sidewalls thereof.

9. The ejecting device as defined in claim 8, wherein said guide pillar and said first positioning hole are adjacent to an end of said distal sidewall.

10. The ejecting device as defined in claim 8, wherein said slide member comprises a positioning hole formed on a top side thereof.

11. The ejecting device as defined in claim 8, wherein said first ejecting spring is a compression spring fitted onto said guide pillar of said base.

12. The ejecting device as defined in claim 11, wherein one of the two ends of said first ejecting spring is fixed onto said slide member.

13. The ejecting device as defined in claim 10, wherein said second ejecting spring is a torsion spring having two bended tips mounted to said first positioning hole of said distal sidewall of said base and said positioning hole of said slide member respectively.

* * * * *